Feb. 10, 1942.  H. F. FRENCH  2,272,969
GALVANIC BATTERY
Filed Jan. 28, 1939  4 Sheets-Sheet 1
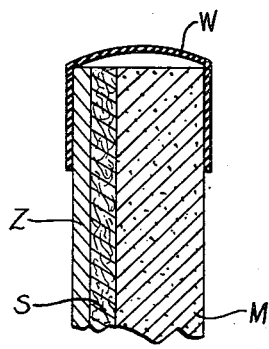
Fig. 1
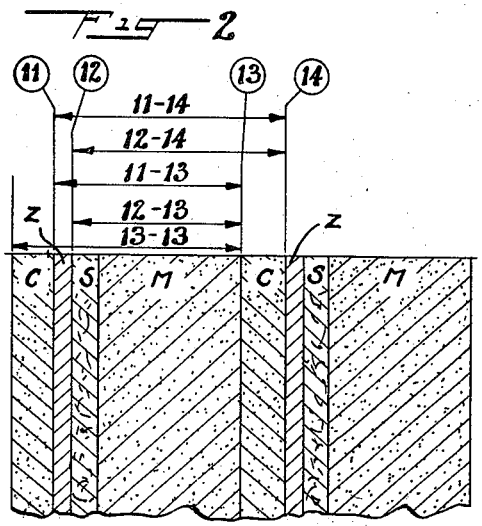
Fig. 2
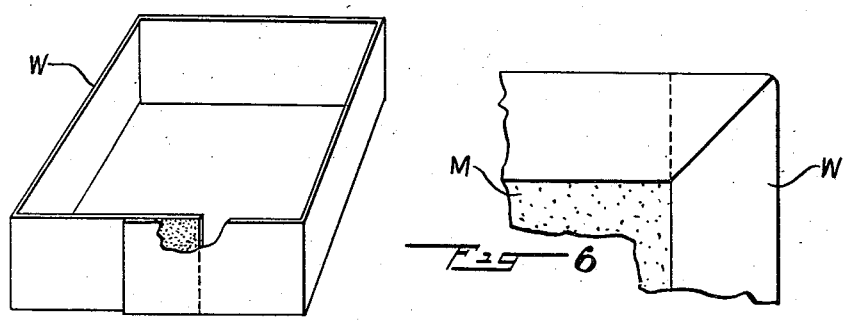
Fig. 3
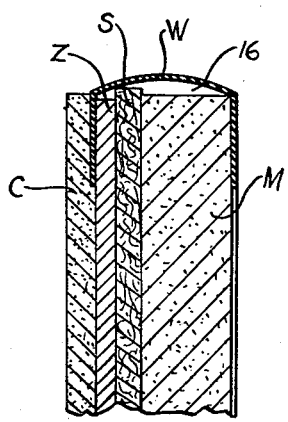
Fig. 5
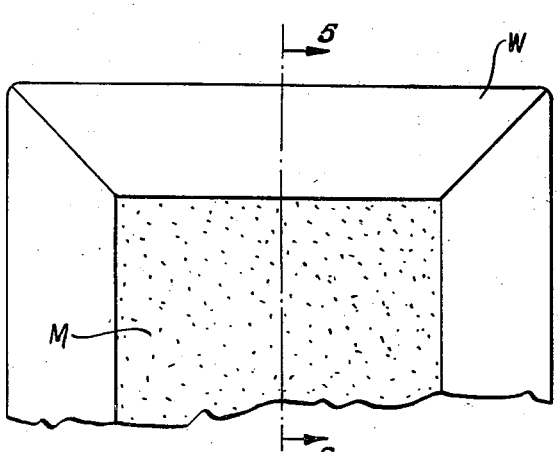
Fig. 4
Fig. 6
INVENTOR
HARRY F. FRENCH
BY
Ed Greenewald
ATTORNEY

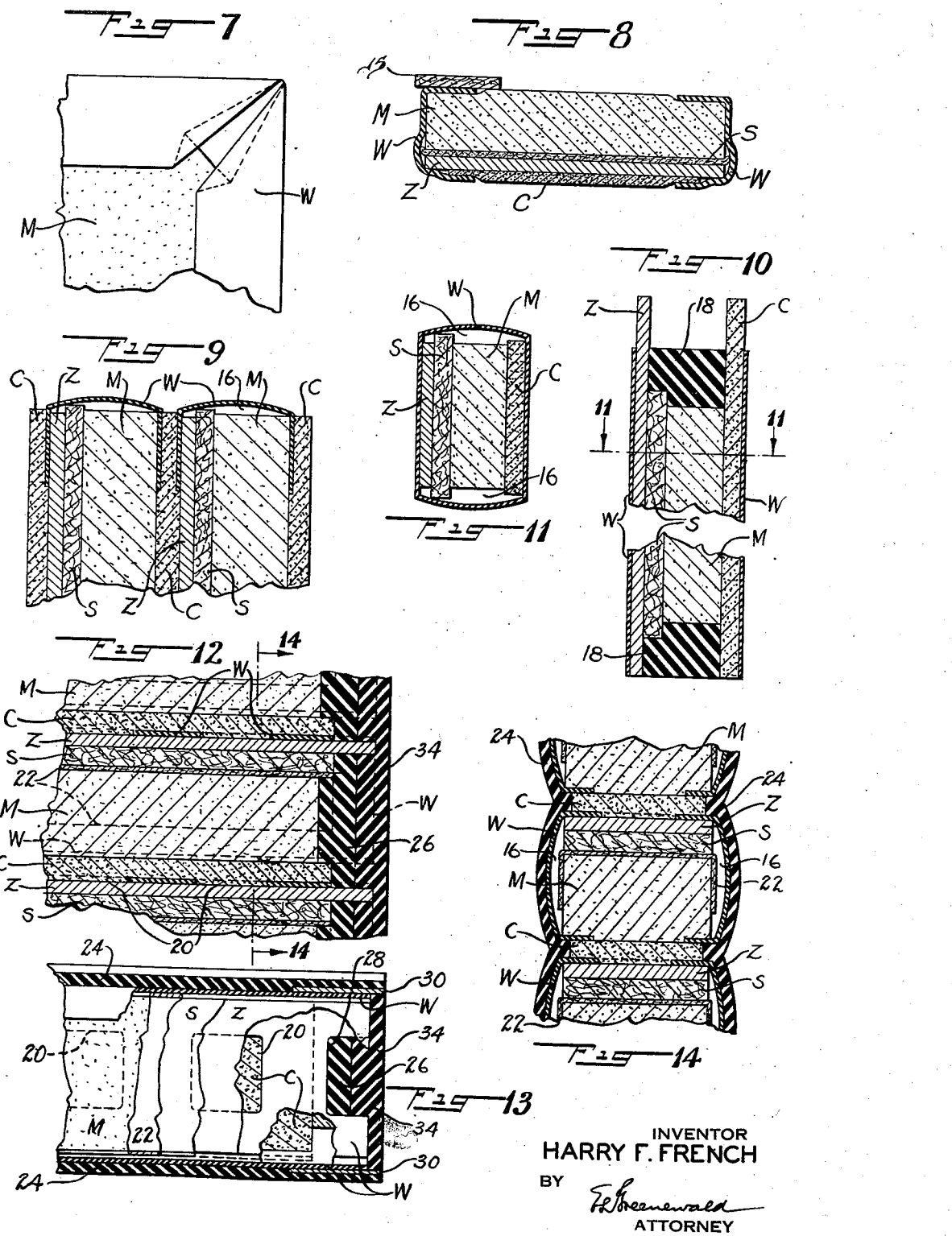

Feb. 10, 1942. H. F. FRENCH 2,272,969
GALVANIC BATTERY
Filed Jan. 28, 1939 4 Sheets-Sheet 3
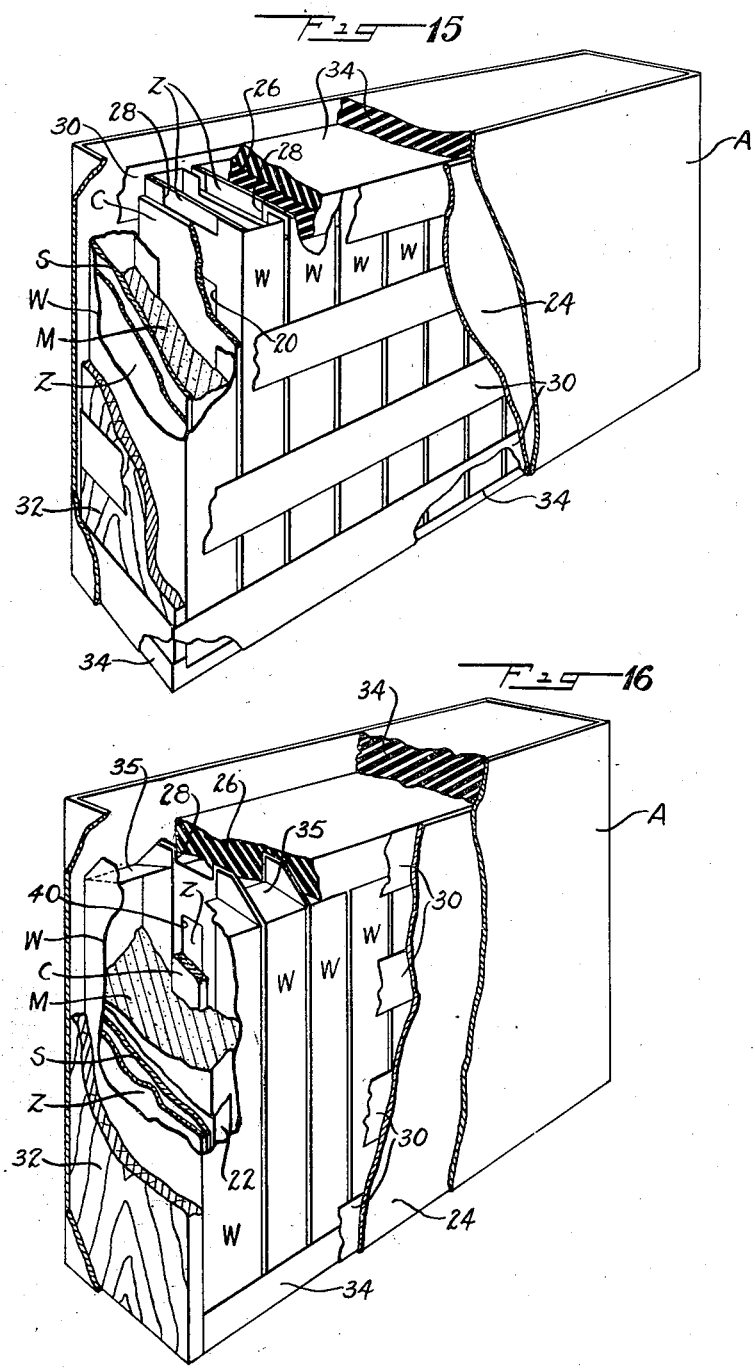
INVENTOR
HARRY F. FRENCH
BY
ATTORNEY Feb. 10, 1942.  H. F. FRENCH  2,272,969
GALVANIC BATTERY
Filed Jan. 28, 1939   4 Sheets-Sheet 4
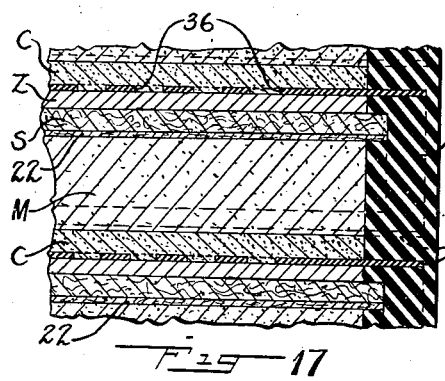
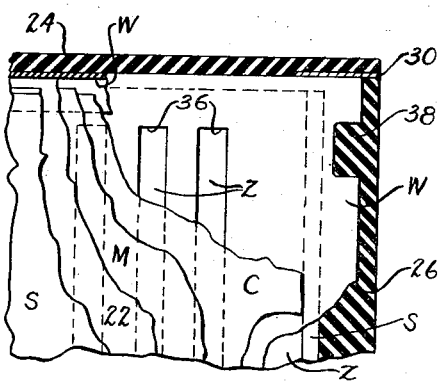
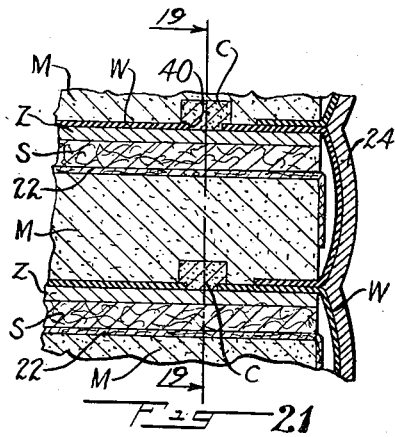
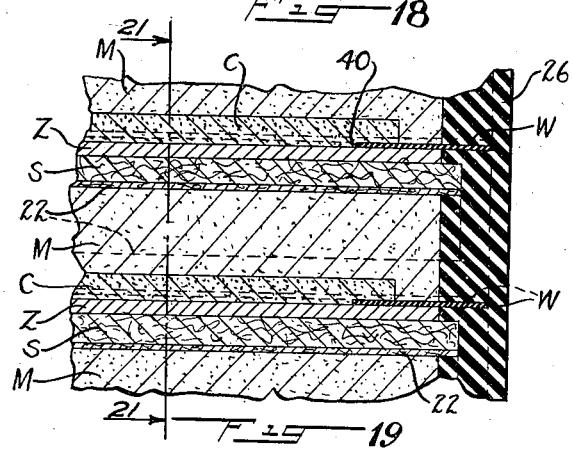
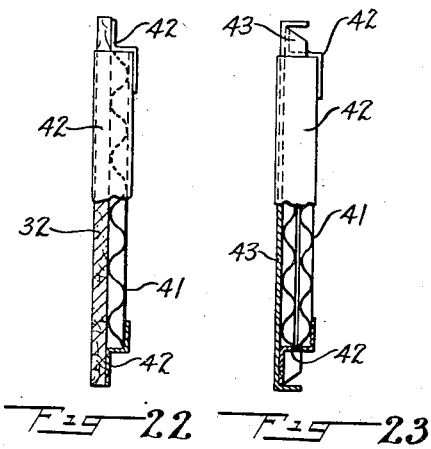
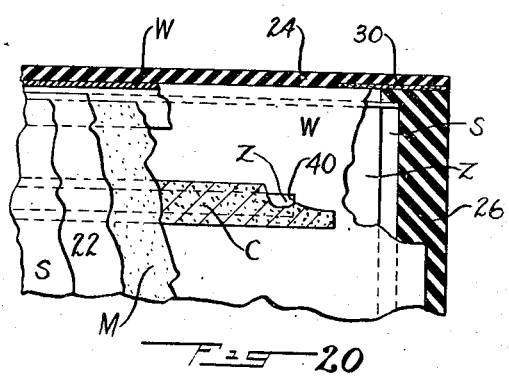
INVENTOR
HARRY F. FRENCH
BY
*E. D. Treenewald*
ATTORNEY Patented Feb. 10, 1942

2,272,969

UNITED STATES PATENT OFFICE 2,272,969

GALVANIC BATTERY

Harry F. French, North Olmsted, Ohio, assignor to National Carbon Company, Inc., a corporation of New York Application January 28, 1939, Serial No. 253,315

21 Claims. (Cl. 136—111)

The invention relates to galvanic batteries and more particularly to dry batteries of the type in which the cells are composed of a stack of suitably arranged flat cell elements. This application is in part a continuation of my application Serial No. 10,184, filed March 9, 1935.

Batteries of this type have come into wide commercial use during the past several years, as radio "B" batteries for instance. One reason for their popularity is that a better efficiency can usually be developed from a given mix in a flat cake than in the more conventional cylindrical bobbin. As the effects of cell action penetrate the mix they encounter a constant area in the flat cake and a continually decreasing area in the cylindrical bobbin. Therefore, the flat cake tends to maintain a relatively lower effective current density at the cathode than the bobbin type. More importantly, the flat cell design yields a better utilization of the battery volume, and this is chiefly due to the fact that a large part of the space which is wasted between cylindrical units can be used to contain active material.

Heretofore, however, it has not been feasible to carry these advantages so far as desirable. For example, present commercial designs, as typified by U. S. Patent No. 1,797,161 to Strohl and Smith, U. S. Patent No. 1,508,987 to Rider and Huntley, U. S. Patent No. 2,025,631 to Adamski, and U. S. Patent No. 1,821,008 to Dittrick et al., show some very significant volumes devoted to air space and to the insulating compound which separates individual cells from one another. Therefore, one of the objects of this invention is to provide a battery of the flat type in which a greater proportion of the volume is devoted to cell elements; in which the air space is in a more efficient position; in which the area of the mix cake is as near as possible that of the zinc anode; and in which a minimum volume is occupied by inter-cell insulation.

Together with the above objects the general objects of the invention are to provide a battery of the type described having an electrical output much greater in proportion to battery volume than in batteries of this type known heretofore; to provide such a battery that is more reliable in operation and less liable to develop internal short circuits; a battery in which the size of the air spaces may be readily varied and controlled; and a battery in which the active elements are more fully utilized. These, and other objects and novel features of the invention will be set forth in detail in the following specification and the accompanying illustrations, in which:

Fig. 1 is a fragmentary sectional view of one edge of a battery unit of the type described embodying one feature of the invention;

Fig. 2 is a diagrammatic view of a series of cell elements showing the various possible spans of the insulating cell wrapping;

Fig. 3 is a perspective view showing one form of a wrapping before it is applied to a unit;

Fig. 4 is a fragmentary side view of an assembled unit.

Fig. 5 is a sectional view along line 5—5 of the unit shown in Fig. 4;

Fig. 6 is a fragmentary side view of one corner of a wrapped unit showing one example of a suitable corner fold in the wrapping;

Fig. 7 is a view similar to that of Fig. 6 showing another example of a suitable corner fold in the wrapping;

Fig. 8 is a sectional view of an alternative type of assembled unit;

Fig. 9 is a sectional view of one edge of a plurality of assembled cells suitably connected;

Fig. 10 is a sectional view of an elongated cell with the wrapping applied to the sides only;

Fig. 11 is a sectional view along line 11—11 of Fig. 10;

Fig. 12 is a fragmentary sectional view through one example of a battery embodying the invention showing the relative position of the edges of the elements;

Fig. 13 is a fragmentary end view of the battery shown in Fig. 12 with various elements broken away different amounts to show the interior structure;

Fig. 14 is a fragmentary sectional view along line 14—14 of Fig. 12 showing the interior structure of the battery;

Fig. 15 is a perspective view of one example of a battery embodying the invention with various portions broken away different amounts to show the interior structure;

Fig. 16 is a perspective view similar to Fig. 15 showing inturned edges of wrapping W to seal the ends of the cells more effectively;

Fig. 17 is a fragmentary sectional view through another form of battery embodying the invention showing the relative size and position of the elements;

Fig. 18 is a fragmentary end view of the battery shown in Fig. 17 with various elements broken away by different amounts to show the interior structure;

Fig. 19 is a fragmentary sectional view through still another form of battery embodying the invention showing the relative size and position of the elements;

Fig. 20 is a fragmentary end view of the battery shown in Fig. 19 with various elements broken away by different amounts to show the interior structure;

Fig. 21 is a fragmentary sectional view along line 21—21 of Fig. 19 showing the interior cell structure;

Fig. 22 is an edge view of a wooden end board provided with a single sheet of collapsible material forming an expansion member; and Fig. 23 is an end edge view of a metal end board provided with two sheets of collapsible material to provide a somewhat larger expansion member.

The invention, as illustrated by the drawings, may be embodied in a dry battery comprising a suitable number of units, such as that shown in Fig. 1, in which each unit consists of a suitable number of flat cell elements of substantially uniform size, such as an anode Z, separator S, and mix M, juxtaposed face to face under pressure, and having the peripheral margin thereof inclosed in a peripheral wrapping W of suitable skin-like electrolyte-proof dielectric material. This wrapping W may start on the face of one element, such as Z, an appreciable distance from the edge, extend over the edges of several elements, and down an appreciable distance on the face of an element, such as M, other than that upon which it starts.

The number of cell elements embraced by the wrapping may vary according to the construction of the battery, the cells, the elements, etc. The range of this variation is illustrated by Fig. 2 in which a succession of cell elements is shown diagrammatically. Of these elements C and Z may be electronic elements such as carbon and zinc (impervious or non-bibulous cathode and anode elements) respectively, and the elements S and M may be bibulous electrolyte-containing elements such as a separator and a dry cell mix (bibulous electrolyte-containing cathode element) respectively. These elements may be arranged in a series such as carbon, zinc, separator, and mix, and the series may be repeated throughout the battery. In Fig. 2 the numeral 11 indicates the dividing (anode-cathode interface) line between the carbon and zinc elements of a first series, and the numeral 12 indicates the dividing line between the zinc and separator elements of the same series, numeral 13 indicates the dividing line (interface between bibulous and nonbibulous cathode elements) between the mix of said first series and the carbon of an adjacent second series, and numeral 14 indicates the dividing line between the carbon and zinc of said second series.

Since the elements S and M are necessarily bibulous, a wrapping to constitute inter-cell insulation must bridge these elements, as indicated by the span 12—13. The nonbibulous elements C and Z are available for suport and attachment of the wrapping. If line 11 is used as one end of the span, the span 11—14 is the longest span available if a similar type of wrapping is to be repeated on adjacent cells. Fig. 2 also indicates spans 12—14, 11—13, and 13—13 as other dipositions for the wrapping, in none of which does the wrapping embrace all of the electronic elements of any one cell. When the span 11—14 is employed adjacent wrappings are contiguous. This span is sometimes disadvantageous because electrolyte accumulations in adjacent wrappings are subject to the direct hazard of intercommunication in case of any failure of the wrapping or its attachment. Spans 12—13 and 12—14 are effective but usually undesirable because the wrapping overhang insulates a portion of the contact between the anode Z and the bibulous separator S. Span 11—13 is generally preferable as it avoids all of the disadvantages of the preceding combinations. Still another span, useful under some circumstances, is from line 13 of one cell to line 13 of an adjacent cell.

An essential point in the success of a construction of this nature is the suitability of the wrapping for the function which it must perform. It must be thin, flexible, of adequate strength to meet the mechanical requirements, and it must remain sufficiently impervious to the cell electrolyte over long periods of time to insulate effectually the adjacent cells.

In practice, a variety of such materials have been found that have proved suitable. For example, two sheets of the commercial moisture-proof type of regenerated cellulose of around .004 inch in thickness, cemented together with some form of commercial rubber paint, such as that used for electrical insulation, make a suitable wrapping. Another suitable method for cementing the sheets together is to spray one side of each with an asphaltic or waxy material in a suitable solvent. The coated sides are then placed together after the solvent has nearly all evaporated, and the sheets are rolled together. Sheets around two or three one-thousandths of an inch in thickness, composed of synthetic resins, including vinyl resins such as vinyl acetate or vinyl chloride resins, or the conjoint polymer of vinyl chloride and vinyl acetate, or vinyl acetal resins, or styrol resins, also form suitable wrappings. Strips of thin rubber-like materials, such as rubber, rubber substitutes which resemble rubber in properties or composition, such as the so-called synthetic rubbers, or rubber substitutes having rubber-like properties such as plasticized polyvinyl chloride, may be used.

The wrapping may be formed and applied in any convenient and appropriate way. For example, wrapping material may be cut in a strip, the ends overlapped and attached together by a suitable cement, and the wrapping then folded to form the shape shown in Fig. 3. The dimensions of this folded wrapping are preferably such as to fit easily around the periphery of a zinc electrode Z, as shown in Fig. 5. Such electrode may be placed on a suitable form, and the wrapping W placed around the form and folded down against the zinc electrode Z to form a peripheral margin. The overhang of the wrapping upon the zinc should be substantial, and it is preferably cemented to the zinc.

Any suitable adhesive may be used for this purpose. One that has been found to be satisfactory for use with regenerated cellulose is an intimate mixture composed of rosin 80 parts by weight and castor oil 20 parts. This mixture in a molten state may be spread upon the outer area or margin of the zinc element where it serves to attach the folded edge of the wrapping to the metal. Where rubber is used as the wrapping material, commercially available rubber adhesives may be used.

When a corner fold is used, this fold may be of any suitable type such as the simple type of corner fold shown in Fig. 6 which is usually satisfactory. If especial safety is desired the corner fold shown in Fig. 7 has the advantage that all possible paths from the inside of the eventual cell terminate in openings well within the peripheral boundaries of the electrode.

If a stretchable rubber-like material is used, the periphery of the wrapping strip (Fig. 3) may be made considerably shorter than the periphery of the cell. In such case, when the wrapping is stretched and placed around the periphery of the cell, the edges of the wrapping (being elastic) will pull naturally over the margins of the faces of the cell elements and, without folding, the wrapping will assume a shape similar to that illustrated in Fig. 1.

It may sometimes be desirable to dispense with an adhesive as a seal between rubber-like wrappings and the supporting cell elements, pressure alone being used to make an electrolyte-tight seal. The rubber-like material, being deformable under pressure, would thus act much like an uncemented gasket.

A carbonaceous coating, such as that designated by the letter C in Fig. 5, which is electrically conductive and impervious to cell electrolyte may be applied to one side of the zinc electrode either before or after application of the wrapping. This coating may consist of a mixture of rosin 170 parts by weight, boiled linseed oil 30 parts, and 400 parts of carbon of assorted sizes such as will pass through screens of 30 and of 100 mesh. Mixtures of this type have been described by Rider et al. in U. S. Patent No. 1,508,987. The coating may be applied to the zinc surface and, if desired, over the overhang of the wrapping on the zinc, by various methods. For example, the warm mixture may be spread upon the zinc and rolled, or the mixture may be independently fabricated in sheet form on sheet metal, removed by stripping when chilled, and the coating then applied to the warmed zinc electrode and rolled into good contact.

A suitable bibulous separator S as shown in Fig. 5 may be placed in contact with the zinc electrode Z. Preferably, the separator is slightly larger than the zinc electrode to prevent contact between the zinc and the depolarizing mix subsequently added. This separator may be of any suitable type, but preferably it should conform with good practice for the type of cell desired, and in general dry cell applications may consist of a sheet of pulpboard or similar bibulous material with the side adjacent the zinc carrying the usual cereal paste.

A cake M, Figs. 4 and 5, compressed from suitable depolarizing mix may be placed on the separator S. The total thickness of elements and the width of the wrapping should originally be related in a manner to allow an overhang for the wrapping to fold down on the back of the mix cake. This folding operation may be similar or identical with one of those already described so that corner folds such as those shown in Figs. 6 and 7 are produced. The unit thus completed has the appearance of that shown in Figs. 4 and 5.

With respect to this unit it should be noted that the wrapping W passes over the separator S and around to the back of the mix cake M. In this manner, due to the separator clearance, that is, the space between the edge of the zinc Z and the somewhat larger separator S, and to the looseness of the wrapping W on the outside of the elements, there may be provided an adequate air space 16 around the edge of the elements for such electrolyte expansion as may later take place. Any mixture of paste and electrolyte which oozes from the high pressure region of the separator subsides in the low pressure air space 16 provided at the edge of the mix cake, and a considerable portion of the electrolyte which it carries may be absorbed by the mix M.

An alternative method of assembling each cell unit, to which the use of rubber-like wrappings is particularly well suited, comprises assembling a stack consisting of a zinc electrode precoated on one side with a conductive adherent coating of carbonaceous material, a pasted bibulous separator against the uncoated side of the zinc electrode, and a mix cake next to the separator; surrounding the peripheral edge of such stack with a stretched wrapper of thin rubber like wrapping material; and permitting the said wrapper to snap into place about the edges of the stack. The wrapper may initially be in the form either of a flat band or of a preshaped wrapping. A self-supporting, easily manipulated unit results. Such a unit is illustrated in Fig. 8.

Preferably, the size of the rubber-like wrapping is so related to the size of the cell unit that the portion of the wrapping surrounding the edge of the cell unit is under tension.

The elements of the units assembled in the various ways described herein are supported in juxtaposed face to face relation by the wrapping, and this feature facilitates assembly of the units into a battery.

When units of the type just described are stacked one upon another a battery is formed. In this battery, as in the generally similar battery illustrated by Fig. 9, the conductive coating or element C makes contact between the zinc Z of one unit and the mix M of the adjacent unit, thus effecting series connection. Such contact may be facilitated, as shown in Fig. 8, by providing the mix cake M with a raised portion within the central opening in the wrapping W; likewise, the impervious carbon element C may project through the central opening in the wrapping W.

The positive electrode for the series may be of sheet metal carrying a conductive coating C of carbonaceous material. The ends of the stack may be supported or stiffened by suitable rigid members such as wood or metal plates 32 and 43 (Figs. 15, 16, 22, 23) and the entire stack tied together by longitudinal bindings of a suitable type such as tape or strips 30 of suitable fabric or paper. Enough pressure may be exerted on the stack prior to or during the tying or binding operation virtually to embed or sink the wrapping overhang or margin into the surface of the margin of the mix cake. This assures good contact between the elements and also blocks the egress of any electrolyte that may later accumulate in the air space provided under the wrapping along the edge of the mix cake.

In a battery of this type, it is generally desirable to add safeguards against too high rates of moisture loss by evaporation from the assembly prepared as already described, and to add an outer container for mechanical protection. These two features may be combined by using a moisture-proof outer container and sealing the assembly therein.

The chief source of moisture loss by evaporation from the bare assembly is at the joint between the wrapping W and the carbonaceous element C at the joint between contiguous wrappings. While it is possible to make the carbonaceous element C softer, or to apply an adhesive, to tighten the joint, it is generally preferable to dip the entire assembly in some type of wax to reduce or seal the outer opening of the joint in question. This procedure obviates the necessity for using a moisture-proof outer container. A suitable dipping mixture which has been found satisfactory for this purpose when regenerated cellulose is used as the wrapping material may consist of paraffin 50 parts by weight, rosin 20 parts and boiled linseed oil 30 parts. A short dip of a few seconds in this wax at a temperature of around 135° C. has been found adequate to apply a desirable quantity of wax coverage. If rubber wrapping material is used, substantially oil-free paraffin alone may be used as the dip. The use of rubber-like wrappings, which as previously mentioned act like gaskets, will in many instances make the use of a moisture-proofing dip or container unnecessary.

Although gas generated within the cells will ordinarily be vented through adventitious minute crevices in the assembly, it will sometimes be desirable to provide specific venting means. A suitable means for this purpose is a strip 15 of paper, lightly impregnated with suitable moisture-proofing material, extending from outside to inside each cell, for instance as shown in Fig. 8.

While batteries made according to the procedure already described make full utilization of the advantages of the wrapped unit method of construction, there are several modifications that tend to simplify the manufacturing processes, and which may be controlled to incur relatively small sacrifices in effectiveness.

For example, one or more sides of each unit may be closed by a sealing compound and the wrapped type of construction applied to the remaining sides. However, since the advantages of the invention reside essentially in the substitution of thin wrapping for the more bulky thermoplastic sealing material, the proportion of the periphery which is sealed by wax should be as small as possible.

An effective method of accomplishing this is to provide relatively long narrow cells, and to use the insulating wrapping on at least the two long sides. A simple form of cell of this type is shown in Figs. 10 and 11. In this cell flat electrodes are used and the anode Z is of zinc. A bibulous separator S slightly wider than the anode is employed, and this in turn is surmounted by a cake of depolarizing mix M and a flat carbon electrode C. The elements may be bound together by a thin electrolyte-proof integument W which is wrapped around the elements. The non-bibulous elements C and Z and the wrapping W may extend beyond the limits of the bibulous members S and M so that a pocket or recess is formed at both of the narrow ends in which an ordinary sealing material 18 may be applied. The non-bibulous elements or connections thereto may be brought out, or other means may be employed for electrical connection to other cells or to an electrical circuit.

When several cells are connected in series in a battery it generally is preferable to provide internal connection between cells by means of contact between suitable contiguous non-bibulous elements. One example of such connection is shown in Figs. 12, 13 and 14. As shown here, the insulating wrapping W may be attached to the inactive surface of the zinc anode Z, and folded around the edges of the bibulous separator S and depolarizing mix M. The outer edges of the wrapping may be folded inwardly and secured between the mix cake M and the surface of the adjacent carbonaceous coating C, as shown in Fig. 14.

The arrangement of this wrapping obviously is much simpler than in the type already described in which the wrapping is applied to all four sides of the elements. When not more than two sides are wrapped, all corner folds, such as those shown in Figs. 6 and 7, are obviated. This reduces considerably certain limitations upon the suitability of various wrapping materials. For example, the absence of sharp bends in the wrapping may allow of the use of sheet Celluloid as a wrapping, which, from thickness, might be too stiff to use successfully in the four side wrapping type. In a similar way, this elimination of sharp corner bends simplifies considerably the application of impregnated paper as a wrapping material, since the hazard of cracking or disruption of the impregnated films in and on the paper is materially reduced.

As a wrapping material in these simplified designs various types of impregnated paper have been used successfully. A preferred method for preparing such paper is as follows:

A suitable material such as ordinary kraft wrapping paper is given two treatments in a solution of suitable ingredients. For example, rosin, 1 part by weight, is melted and to this 4 parts of tung oil is added. These ingredients are heated with stirring until well mixed, cooled somewhat, and then diluted with two parts of a solvent such as ethylene dichloride.

The kraft paper is submerged in this solution and permitted to soak for a period of about 15 minutes. At the end of this time the paper is removed from the solution, the excess surface oil is removed, by a scraper lightly applied, and the paper is hung in an oven having a temperature of about 75° C.

The sheets become dry in about 4 hours, when the coating treatment is repeated. Paper such as that described, when treated by this double impregnation ordinarily shows a weight increase corresponding to from 5 to 6 grams of total dried crating on a piece 10 inches square.

In order that direct electronic connection may be established between adjacent cells, openings or windows 20, shown in Fig. 13, may be provided in the portion of the insulating wrapping which covers the inactive surface of the zinc anode Z. The impervious carbon element C being positioned directly against the wrapping on the zinc Z makes good electrical contact with the metal, with the result that a series connection is established thereby between the carbon positive element C of one cell and the zinc negative element Z of the next cell. This type of construction may utilize other features to enhance safety and feasibility. For example, to prevent any short circuiting from particles of the mix M, Fig. 14, which may become dislodged from the mix cake and make contact with the zinc anode Z during the assembling operation, a thin sheet of bibulous paper, fabric, or similar electrolyte permeable material 22, may be placed between the depolarizing mix M and the separator S, and the outer edge of this material may extend beyond the outer edge of the separator S and be folded, together with the insulating wrapping W, down against or along the edge of the mix cake M. A dipped coating 24 of wax, such as that already described to prevent moisture loss from the assembled cells, is also shown in Fig. 14.

In order to provide adequate anchorage for the insulating compound 26, Fig. 12, a window or opening 28, may be provided at the outer end of the wrapping W so that the seal 26 may be in contact with a portion of the surface of the zinc element Z. Such end windows 28 may be provided at both top and bottom of each wrapped cell.

A plurality of wrapped units assembled into a battery of several cells in series and tied together with strips of fabric or paper tape 30 is shown in Fig. 15. The ends of the assembly here shown may be stiffened by the use of endboards 32, and the assembly may be inclosed in a suitable container A. The top and bottom ends of the cell units are filled with insulating compound, and two varieties of insulating seal have been found advantageous, of which one may be a slightly plastic seal 26, and the outer seal 34 of hard sealing wax made of rosin and filler.

To further seal the ends of the air spaces 16 the edges of the wrapping W may be folded inwardly as shown at 35 in Fig. 16, so that the sealing material 26 may flow both under and over the edges of the wrapping W and provide a more effectual closure at the ends of the cells. In this structure the inwardly folded edges 35 of the wrapping W form end closures for the air spaces 16 and as these closures are completely embedded in the sealing material the escape of electrolytic paste or electrolyte which may find its way into the low pressure air spaces along the edges of the depolarizing mix is effectively prevented.

Another suitable arrangement of elements is shown in Figs. 17 and 18. In this construction the insulating wrapping W may extend beyond the active elements up into the insulating compound 26. Windows 36 may be provided in the portion of the wrapping which covers the inactive surface of the zinc anode Z to provide electronic series connection between the impervious carbon C of one cell and the zinc anode Z of the adjacent cell, as described in the construction shown in Fig. 12. To facilitate the flow of the plastic sealing material during assembly a channel opening 38 (Fig. 18) may be provided through the upwardly extending end of the wrapping when desirable.

Still another suitable arrangement of the elements in these wrapped unit assemblies is shown in Figs. 19, 20, and 21. In this construction the space occupied by the inert impervious carbon layer C has been reduced, thus providing more room for the active depolarizing mix M. To reduce this space the wrapping W may be provided with one or more narrow openings or windows 40, and each of these windows may be covered by a strip of impervious carbon C which provides suitable contact with the anode Z of the adjacent cell.

As is well known to those skilled in the art, dry cell elements may be subject to swelling from the formation of crystals of the products of chemical reaction within the cell. This results in a tendency toward increase in length of such a stack of battery elements as this invention discloses. Without some protection against this action the expansion pressure in time may occasion a distortion of the elements and under some circumstances even reaching a degree sufficient to burst the binding tapes and rupture the outer nest. To relieve this pressure by taking up the expansion I have devised expansion members which, when inserted within the assembly, preferably at the ends, permit expansion without rupture of the binding tapes. Such an expansion member may consist of an endboard upon which is mounted one or more sheets of a collapsible or crushable material held in place by a suitable attachment. The form illustrated in Fig. 22 is composed of a sheet of single-faced corrugated strawboard or the like, 41, affixed to a wooden endboard 32, with gummed paper tape or similar fastening 42, so applied as to close the openings along sides and ends to prevent entrance of sealing materials which would interfere with the compression of the collapsible sheet. The form of expansion member shown in Fig. 23, consists of a metal end plate 43, with edges upturned to provide stiffness, and two sheets of single-faced corrugated strawboard 41, affixed thereto with gummed paper tape 42, along sides and ends. Any suitable number of sheets of the collapsible material may be used.

The various features of the invention may be employed either singly or in combination, and the various structural elements may vary in size, shape, form, and relative arrangement. Also, similar and equivalent materials may be employed in place of those described without departing from the objects of the invention or the means by which they are obtained.

I claim:

1. A primary galvanic battery of substantially flat cell elements comprising groups of electrolyte-containing cell elements alternating with groups of impervious anode and cathode cell elements, such groups being juxtaposed face to face to form a battery; and, for isolating the electrolyte in each of said electrolyte-containing groups from that in adjacent electrolyte-containing groups, an integument of substantially electrolyte-proof dielectric sheet material inclosing the peripheral margin of each of said groups of electrolyte-containing cell elements, embracing such group of electrolyte-containing cell elements but not all of the impervious cell elements of any one cell, and extending well within the peripheral boundaries of the electrolyte-containing elements in each of said groups.

2. A primary galvanic battery as claimed in claim 1, in which the integument is of substantially electrolyte-proof elastic stretchable material.

3. A primary galvanic battery as claimed in claim 1, in which the integument is of substantially electrolyte-proof elastic stretchable material, and in which a marginal portion of said integument is sealed to an impervious cell element by an electrolyte-resistant adhesive.

4. A primary galvanic battery as claimed in claim 1, in which the integument, embracing said group of electrolyte-containing cell elements, extends only from the interface between the impervious and electrolyte-containing cathode elements of one cell to a face of the impervious cathode element of an adjacent cell.

5. A primary galvanic battery as claimed in claim 1, in which said cell elements include a mix cake, and in which an inwardly extending portion of said integument is adjacent the mix cake and is provided with an opening, and in which such mix cake is provided with a raised portion within said opening.

6. A primary galvanic battery as claimed in claim 1, in which an inwardly extending portion of said integument is adjacent an impervious cathode element and is provided with an opening, and in which said cathode element is a carbon element that projects through said opening.

7. A primary galvanic battery of substantially flat cell elements comprising groups of electrolyte-containing cell elements alternating with groups of substantially impervious anode and cathode cell elements, such groups being juxtaposed face to face under pressure to form a battery; and, for isolating the electrolyte in each of said groups of electrolyte-containing elements from that in adjacent groups, an integument composed of substantially electrolyte-proof elastic, stretchable dielectric material inclosing the peripheral margin of each of said groups of electrolyte-containing cell elements and having marginal portions extending well within the peripheral boundaries of the electrolyte-containing cell elements in each of said groups in such manner that said marginal portions of the dielectric material are under pressure between adjacent elements.

8. A primary galvanic battery of substantially flat cell elements comprising groups of electrolyte-containing cell elements alternating with groups of substantially impervious anode and cathode cell elements, such groups being juxtaposed face to face under pressure to form a series of substantially flat cells; and, for isolating the electrolyte in each of said groups of electrolyte-containing cell elements from that in adjacent groups, an integument composed of thin electrolyte-proof rubber dielectric material inclosing under tension the peripheral margin of each of said groups of electrolyte-containing cell elements and having marginal portions extending without folds well within the peripheral boundaries of the electrolyte-containing cell elements in each of said groups in such manner that said marginal portions of the dielectric material are under pressure between adjacent elements.

9. In a primary galvanic battery comprising groups of bibulous, electrolyte-containing flat cell elements alternating with groups of non-bibulous, cathode and anode flat cell elements, such groups being juxtaposed in electrical contact relation face to face under pressure, and a binding embracing a plurality of such groups, the improvement which consists of a sheathing integument for isolating the electrolyte in each of said bibulous groups from the electrolyte in adjacent bibulous groups, said sheathing integument consisting of substantially electrolyte-proof, dielectric, elastic, stretchable sheet material, extending along the peripheral margin of each of said groups of bibulous elements and inwardly well within the peripheral boundaries of said bibulous elements, the configuration of said elements being such that said binding presses said inwardly extending portions of the integument between peripheral boundary faces of adjacent elements to effect a seal.

10. A primary galvanic battery comprising a series of flat cells composed of a plurality of groups of bibulous elements containing electrolyte and a plurality of groups of non-bibulous anode and cathode flat elements in alternate arrangement of groups, substantially all of the surface of one side of each anode being in contact with a bibulous element; for isolating the electrolyte in each group of bibulous elements from that in adjacent groups of like elements, an electrolyte-proof sheet integument covering the periphery and peripheral margin of each of said groups of bibulous elements and at least one but not all of the non-bibulous elements of any one cell, such integument extending well within the peripheral boundaries of said bibulous elements and being spaced from the periphery of said bibulous elements to provide an expansion space for said electrolyte; and an adhesive securing one margin of said integument to the margin of at least one of said non-bibulous elements.

11. A primary galvanic battery comprising groups of bibulous electrolyte-containing flat cell elements alternating with groups of non-bibulous anode and cathode elements, such groups being juxtaposed face to face; and, for isolating the electrolyte in each group of bibulous elements from that in adjacent bibulous groups, a separate annular integument composed of moisture-proofed regenerated cellulose inclosing the peripheral margin of each of said groups of bibulous elements, embracing such group of bibulous elements, extending only from the anode-cathode interface to the interface between the bibulous and non-bibulous cathode elements, being cemented to the anode, and extending well within the peripheral boundaries of such bibulous elements; substantially all of the surface of one side of each anode element being in contact with a bibulous element.

12. A primary galvanic battery comprising a series of cornered cell elements composed of groups of bibulous elements containing electrolyte and groups of non-bibulous anode and cathode elements; and for isolating the electrolyte in each of said groups of bibulous elements from that in adjacent groups of like elements, an annular wrapping of flat strip electrolyte-proof dielectric sheet material inclosing the periphery and peripheral margin of each of said groups of bibulous elements, said wrapping being adhesively secured to a non-bibulous element and having corner folds in which all paths from the inside of the wrapping terminate in openings well within the peripheral boundaries of the elements.

13. A primary galvanic battery comprising an assembly of elongated cell elements composed of adjacent alternate groups of bibulous electrolyte-containing elements and groups of non-bibulous elements; and means for isolating the electrolyte in each of said groups of bibulous elements from that in adjacent groups of like elements comprising a wrapping of dielectric electrolyte-proof material around at least the two long sides of each of said groups of bibulous elements and extending somewhat beyond the ends of said elements so that a recess is provided within the wrapping at each end of the elements; and a thermoplastic sealing material in each of said recesses.

14. A primary galvanic battery comprising an assembly of elongated cell elements composed of adjacent alternate groups of bibulous electrolyte-containing elements and groups of non-bibulous elements; and means for isolating the electrolyte in each of said groups of bibulous elements from that in adjacent groups of like elements comprising a wrapping of dielectric electrolyte-proof material around at least the two long sides of each of said groups of bibulous elements and extending somewhat beyond the ends of said elements with the edge portions folded inwardly so that a recess is provided within the wrapping at each end of the element; and a thermoplastic sealing material in each of said recesses covering both the inner and outer surfaces of said inwardly folded edge portions.

15. A primary galvanic battery comprising an assembly of elongated cell elements composed of adjacent alternate groups of bibulous electrolyte-containing elements and groups of somewhat longer non-bibulous elements; means for isolating the electrolyte in each of said groups of bibulous elements from that in adjacent groups of like elements comprising a wrapping of dielectric electrolyte-proof material around the sides of each of said groups of bibulous elements, extending beyond the ends thereof substantially to the ends of adjacent non-bibulous elements, and provided with openings in the extending end portions thereof adjacent said non-bibulous elements; and a filling of thermoplastic sealing material in each end of said wrapping that extends through said openings in contact with one of said adjacent non-bibulous elements.

16. A primary galvanic battery comprising a suitably connected series of adjacent cells each composed of an anode, a separator and a mix cake both containing electrolyte, and a cathode, in the order named; means for isolating the electrolyte in each of said cells from that in adjacent cells comprising a wrapping of dielectric electrolyte-proof material around at least the peripheral margin of the anode, the separator, and the mix cake of each cell; and means for preventing dislodged particles of the mix cake from making contact with the anode comprising a sheet of electrolyte-permeable material between the separator and mix cake of each cell with the outer margin thereof lying along the side of the mix cake within said wrapping.

17. A primary galvanic battery comprising a suitably connected assembly of cells composed of substantially flat cell elements; means comprising a substantially electrolyte-proof material secured around the periphery and peripheral margin of at least two of the elements of each of said cells to isolate the electrolyte of each cell from that of adjacent cells; means comprising relatively fixed rigid members for respectively supporting the ends of said assembly; and means comprising one or more sheets of collapsible material between said assembly and each of said rigid members to provide space for expansion of said assembly.

18. A primary galvanic battery comprising a suitably connected assembly of adjacent cells each composed of substantially flat cell elements with adjacent faces thereof in contact; means comprising a wrapping around the edge and peripheral margin of the contact faces of at least part of the elements of each of said cells to isolate the electrolyte of each cell from that of adjacent cells; a nonmetallic fibrous collapsible flat member adapted to permit limited expansion of said elements and adjacent a face of one of said cells; means comprising a rigid member at each end of said assembly; and a longitudinal binding around said assembly and said rigid members of sufficient strength to embed the margin of the said wrapping into the margin of the contact face of one or more of the said elements.

19. A primary galvanic battery comprising electrically connected adjacent groups of flat cell elements assembled as a battery of substantially flat cells, each group composed of an anode, a cathode, a separator, and a mix cake, of which elements the latter two contain electrolyte; for isolating the electrolyte in each of said groups from that in adjacent groups, a wrapping of dielectric electrolyte-proof material around each group of elements, each wrapping being adhesively secured to said anode and being provided with at least one opening in the portion thereof between the anode of one group and the mix cake of an adjacent group; and, for providing contact between adjacent groups of elements, an impervious carbon element embedded in the mix cake of one group over each such opening and in contact with the anode of an adjacent group.

20. An assembly unit for a primary galvanic battery comprising flat cell elements consisting of a soluble metal electrode provided on one face with an adherent impermeable electrically conductive coating of carbonaceous material, a bibulous separator against the other side of said electrode, and a mix cake containing electrolyte and depolarizing material against the separator; and an integument of substantially electrolyte-proof dielectric sheet material inclosing the peripheral margin of the unit, extending well within the peripheral boundaries of the elements, and supporting the elements in juxtaposed relation, the span of said integument being only from the outer surface of said mix cake to the outer surface of said coated metal electrode.

21. An assembly unit for a primary galvanic battery comprising flat cell elements consisting of a soluble metal electrode provided on one face with an adherent impermeable conductive coating of carbonaceous material, a bibulous separator against the other side of said electrode, and a mix cake containing electrolyte and depolarizing material against the separator; and an integument of substantially electrolyte-proof dielectric, elastic, stretchable sheet material inclosing under tension the peripheral margin of the unit, extending without folds well within the peripheral boundaries of the elements, bridging all of said elements, adhesively secured to said metal electrode, and supporting the elements in juxtaposed relation, the span of said integument being only from the outer surface of said mix cake to the outer surface of said coated metal electrode.

HARRY F. FRENCH.